United States Patent
Kasuya et al.

(10) Patent No.: US 12,242,026 B2
(45) Date of Patent: Mar. 4, 2025

(54) OPTICAL ELEMENT AND OPTICAL ELEMENT PRODUCTION METHOD

(71) Applicant: Konica Minolta, Inc., Tokyo (JP)

(72) Inventors: Jinichi Kasuya, Kokubunji (JP); Kazunari Tada, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 1003 days.

(21) Appl. No.: 17/251,503

(22) PCT Filed: Jun. 7, 2019

(86) PCT No.: PCT/JP2019/022739
§ 371 (c)(1),
(2) Date: Dec. 11, 2020

(87) PCT Pub. No.: WO2019/240039
PCT Pub. Date: Dec. 19, 2019

(65) Prior Publication Data
US 2021/0124091 A1    Apr. 29, 2021

(30) Foreign Application Priority Data

Jun. 14, 2018 (JP) ................... 2018-114006

(51) Int. Cl.
*G02B 1/115* (2015.01)

(52) U.S. Cl.
CPC ................... *G02B 1/115* (2013.01)

(58) Field of Classification Search
CPC ...................................... G02B 1/115
(Continued)

(56) References Cited

U.S. PATENT DOCUMENTS

| | | | | |
|---|---|---|---|---|
| 5,854,708 A | * | 12/1998 | Komatsu | ............. C03C 17/3411 |
| | | | | 359/507 |
| 2014/0374255 A1 | * | 12/2014 | Hongo | ................... G01N 15/12 |
| | | | | 204/627 |
| 2020/0023618 A1 | * | 1/2020 | Teranishi | .......... B32B 17/10036 |

FOREIGN PATENT DOCUMENTS

| | | | |
|---|---|---|---|
| CN | 201446940 U | * | 5/2010 |
| JP | H10-036144 A | | 2/1998 |

(Continued)

OTHER PUBLICATIONS

Translation of JP 2001286754 (Year: 2023).*

(Continued)

*Primary Examiner* — Jerry L Brooks
(74) *Attorney, Agent, or Firm* — LUCAS & MERCANTI, LLP

(57) ABSTRACT

Provided is an optical element having particularly excellent salt water resistance and capable of exhibiting a photocatalytic effect. An optical element 100 is obtained by forming a multi-layer coating MC having two or more layers on a glass substrate GL that is an optically-transparent base plate. The multi-layer coating MC has at least one low-refractive-index layer L and at least one high-refractive-index layer H, and a topmost layer 10 farthest from the glass substrate GL is the low-refractive-index layer L. The high-refractive-index layer H adjacent to the topmost layer 10 is a functional layer 20 containing, as a main component, a metal oxide having a photocatalytic function. The topmost layer 10 has a plurality of pores 30 that partially expose a surface of the functional layer 20.

16 Claims, 5 Drawing Sheets

(58) Field of Classification Search
USPC .......................................................... 359/601
See application file for complete search history.

(56) References Cited

FOREIGN PATENT DOCUMENTS

| | | | |
|---|---|---|---|
| JP | 2001286754 A | * | 10/2001 |
| JP | 2009-053373 A | | 3/2009 |
| WO | 2013/137209 A1 | | 9/2013 |
| WO | 2017/056598 A1 | | 4/2017 |

OTHER PUBLICATIONS

Translation of CN201446940 (Year: 2024).*
PCT, International Search Report for the corresponding patent application No. PCT/JP2019/022739, dated Sep. 3, 2019, with English translation.
PCT, Written Opinion of the International Searching Authority for the corresponding patent application No. PCT/JP2019/022739, dated Sep. 3, 2019, with English translation.

* cited by examiner

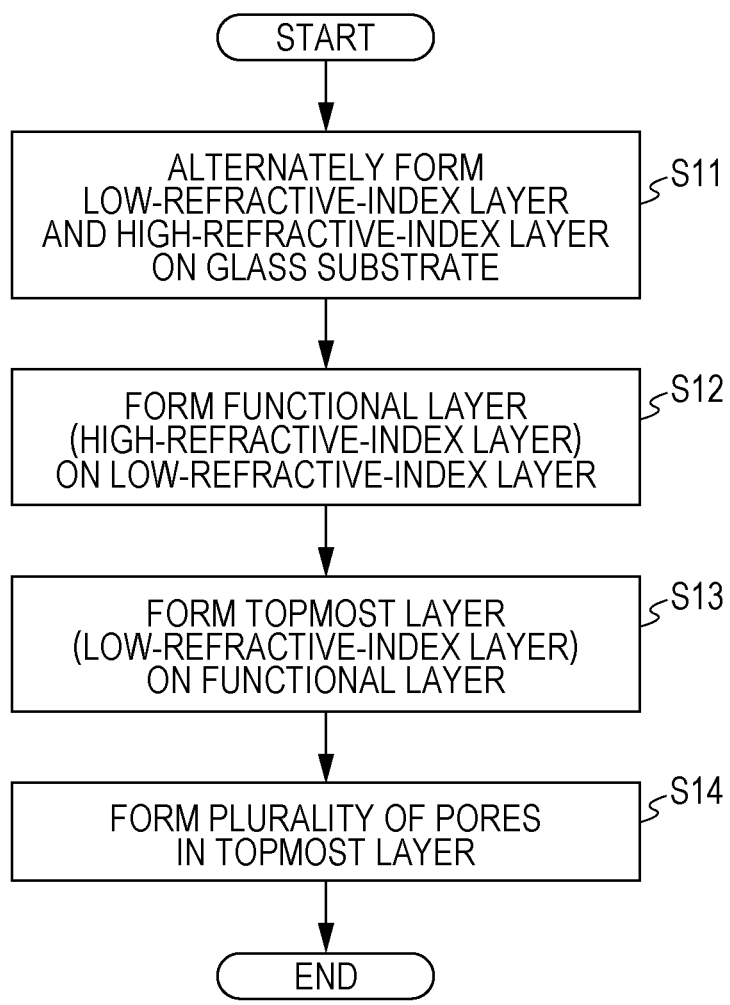

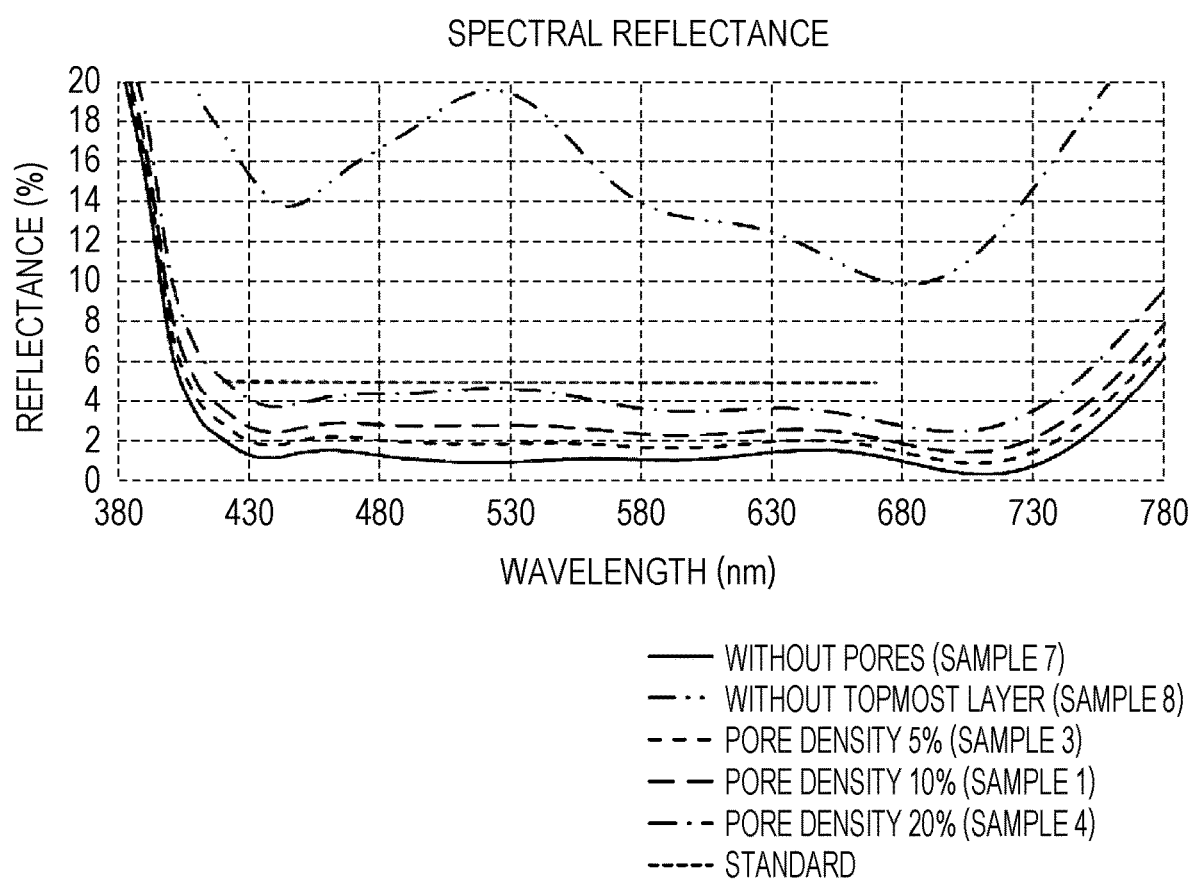

OPTICAL ELEMENT AND OPTICAL ELEMENT PRODUCTION METHOD

CROSS REFERENCE TO RELATED APPLICATION

This Application is a 371 of PCT/JP2019/022739 filed on Jun. 7, 2019 which, in turn, claimed the priority of Japanese Patent Application No. 2018-114006 filed on Jun. 14, 2018, both applications are incorporated herein by reference.

TECHNICAL FIELD

The present invention relates to an optical element formed with a multi-layer coating, and an optical element production method.

BACKGROUND ART

For example, an in-vehicle camera is mounted on a vehicle to support driving of the vehicle. More specifically, a camera that captures behind and sides of the vehicle is mounted on a body of the vehicle, and a blind spot is reduced by displaying an image captured by this camera in a position that can be visually recognized by a driver, which can contribute to safe driving.

Meanwhile, the in-vehicle camera is often mounted outside the vehicle, and water droplets and dirt such as mud often adhere on a lens thereof. Depending on a degree of water droplets or dirt attached to the lens, an image captured by the camera may become unclear. Therefore, there has been development of a technique for cleaning organic substances attached to a surface by irradiation with ultraviolet rays, by applying a photocatalytic substance to an object side surface of the lens. For example, it is conceivable to apply Ti nanoparticles having a photocatalytic effect to an object side surface of an imaging lens mounted on an in-vehicle camera.

Patent Literature 1 discloses a base material with an antireflection film that is formed with a film with a reduced reflectance without damaging photocatalytic performance of photocatalytic particles, and that has a self-cleaning property. The base material with an antireflection film of Patent Literature 1 is formed by laminating a high-refractive-index layer and a low-refractive-index layer in this order on a surface of the base material. The high-refractive-index layer contains particles having the photocatalytic performance, and the low-refractive-index layer contains a porous silicone resin.

Meanwhile, an imaging lens or the like mounted on the in-vehicle camera is used in a severe environment. Therefore, sufficient environmental resistance performance is required. More specifically, due to an impact and wind pressure caused by traveling of a vehicle, and dust that is bounced up by traveling, an optical surface of the exposed imaging lens may be scratched or eroded. Furthermore, salt water contained in sea breeze, acid rain, chemical agents such as detergents and waxes used for car washing, and the like may cause surface deterioration and quality change.

However, in the base material of Patent Literature 1, a coating material containing a porous silicone resin for the low-refractive-index layer is applied on the high-refractive-index layer by wet film formation, which causes a problem that a density of a film for the low-refractive-index layer is low, and it is particularly difficult to secure salt water resistance.

CITATION LIST

Patent Literature

Patent Literature 1: JP 2009-53373 A

SUMMARY OF INVENTION

It is an object of the present invention to provide an optical element that is particularly excellent in salt water resistance and can exhibit a photocatalytic effect, and a production method of the optical element.

In order to achieve at least one of the above-mentioned objects, an optical element that reflects one aspect of the present invention is obtained by forming a multi-layer coating having two or more layers on a base plate that is optically transparent. The multi-layer coating has at least one low-refractive-index layer and at least one high-refractive-index layer. A topmost layer farthest from the base plate is the low-refractive-index layer, and the high-refractive-index layer adjacent to the topmost layer is a functional layer containing, as a main component, a metal oxide having a photocatalytic function. The topmost layer has a plurality of pores that partially expose a surface of the functional layer. Here, the low-refractive-index layer means a layer having a refractive index of 1.7 or less. The high-refractive-index layer means a layer having a refractive index of 1.9 or more.

In order to achieve at least one of the above-mentioned objects, an optical element production method that reflects one aspect of the present invention is a production method of an optical element obtained by forming a multi-layer coating having two or more layers on a base plate that is optically transparent. The multi-layer coating has at least one low-refractive-index layer and at least one high-refractive-index layer. The production method includes: forming the low-refractive-index layer as a topmost layer farthest from the base plate; forming a functional layer containing, as a main component, a metal oxide having a photocatalytic function, as the high-refractive-index layer adjacent to the topmost layer; and forming, in the topmost layer, a plurality of pores that partially expose a surface of the functional layer.

BRIEF DESCRIPTION OF DRAWINGS

FIG. 3 is a flowchart for explaining an optical element production method.

FIG. 5 is a graph showing a spectral property of multi-layer coatings of an example and a comparative example.

DESCRIPTION OF EMBODIMENTS

Figure 1:
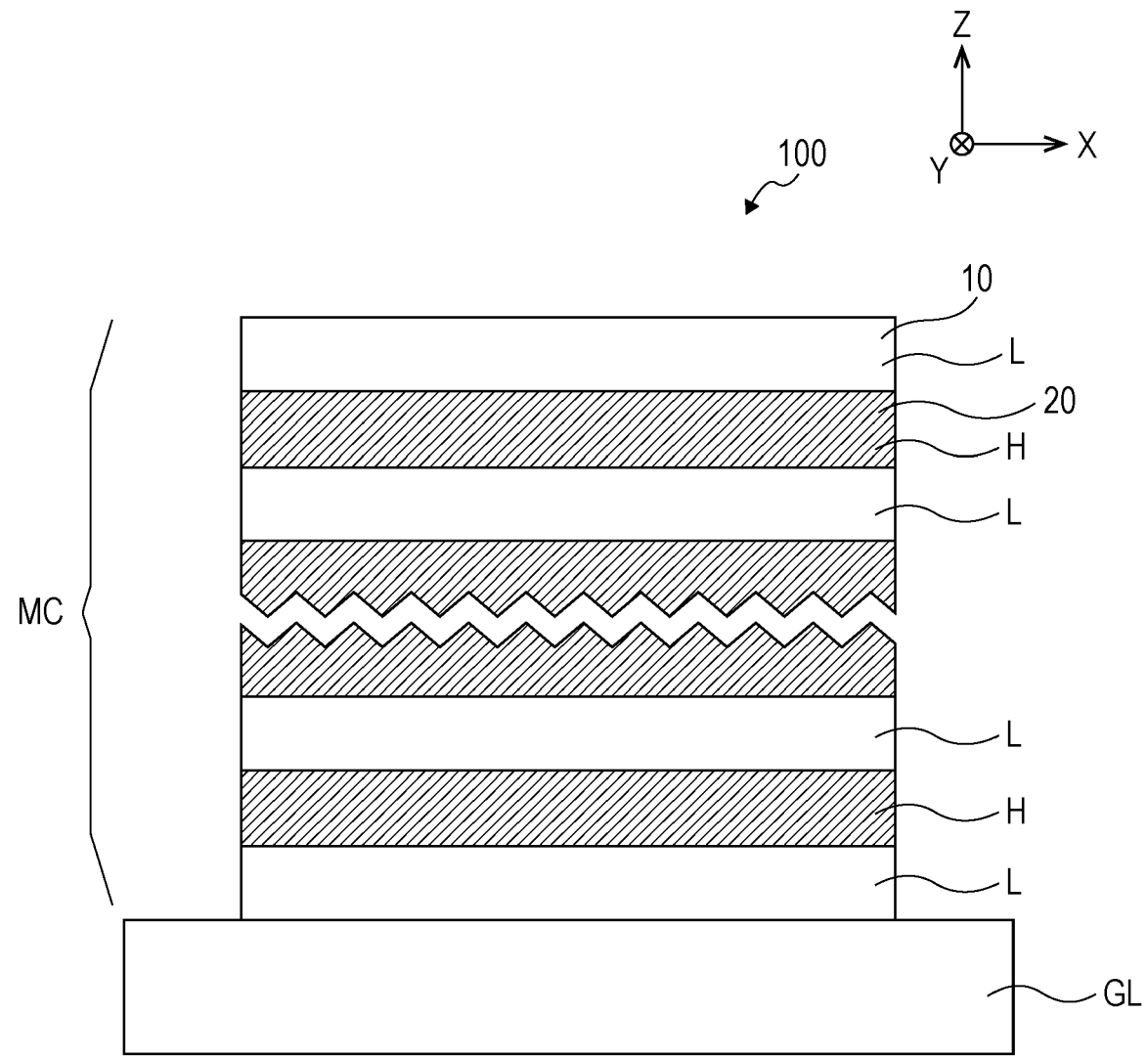
FIG. 1 is a view schematically showing a cross section of an optical element according to the present embodiment.

Hereinafter, an embodiment of the present invention will be described with reference to the drawings. FIG. 1 is a view schematically showing a cross section of an optical element according to the present embodiment. An optical element 100 shown in FIG. 1 has a multi-layer coating MC having a structure in which a low-refractive-index layer L and a high-refractive-index layer H are alternately laminated on a glass substrate (glass base plate) GL, which is a base plate that is optically transparent. However, the high-refractiveindex layer H may be in contact with the glass substrate GL. Such an optical element 100 can be used as an in-vehicle lens or a communication lens. Further, in FIG. 1, a layer located between the glass substrate GL and a functional layer 20 may be replaced as an equivalent film of an intermediate-refractive-index layer, instead of the high-refractive-index layer or the low-refractive-index layer.

In FIG. 1, a topmost layer 10 farthest from the glass substrate GL is the low-refractive-index layer L, and the high-refractive-index layer H provided below the topmost layer 10, which is the high-refractive-index layer H adjacent to the topmost layer 10 in the case of the present embodiment, is the functional layer 20 of a metal oxide having a photocatalytic function. By using the low-refractive-index layer L having relatively high strength as the topmost layer 10, scratch resistance can be improved. Further, since the functional layer 20 exhibits a photocatalytic function by using active oxygen excited by UV light through or via the topmost layer 10, it is preferable to place the functional layer 20 as close as possible to the topmost layer 10. By providing the functional layer 20 adjacent to the topmost layer 10, for example, the photocatalytic function can be effectively exhibited. Further, by using a metal oxide having a photocatalytic effect and a photoactive effect as the functional layer 20, surface organic matter can be removed and superhydrophilicity of the topmost layer 10 can be maintained. For the functional layer 20, for example, $TiO_2$ or the like is used. When the functional layer 20 using $TiO_2$ is formed by using ion assisted deposition (hereinafter referred to as IAD), the photocatalytic effect is enhanced.

"Photocatalytic function" means a self-cleaning function such as effectively removing contacting harmful substances such as organic compounds and bacteria by strong oxidizing power generated by incident of sunlight or artificial light, and preventing water droplets from staying on a surface by hydrophilic action and cleaning oily stains and the like with water without fixing. For example, it is a function of titanium dioxide. Note that "being adjacent to the topmost layer" also includes a case of providing a layer (for example, a layer of 20 nm or less) that can be considered not to interfere with exertion of the function between the topmost layer 10 and the functional layer 20, in addition to a case where the topmost layer 10 and the functional layer 20 are in close contact with each other.

Figure 2:
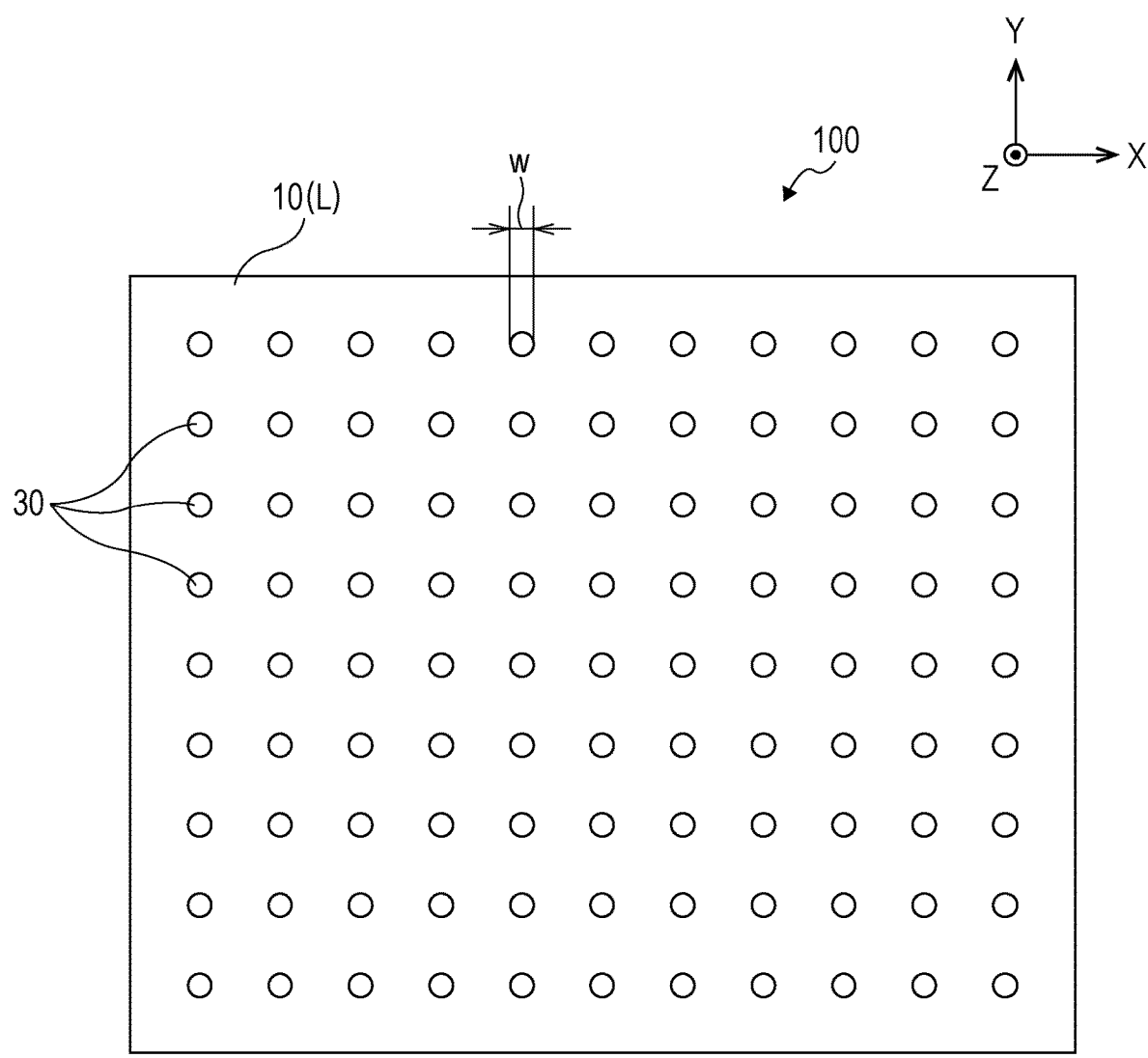
FIG. 2 is an enlarged view of a surface of the optical element shown in FIG. 1.

As shown enlarged in FIG. 2, the low-refractive-index layer L of the topmost layer 10 has a plurality of pores 30 for exertion of the photocatalytic function by the adjacent functional layer 20, which is the high-refractive-index layer H. While details will be described later, the pores 30 are formed by electron beam (EB) drawing. A ratio (hereinafter referred to as pore density) of a total area of cross sections of the plurality of pores 30 (a total area of the pores 30 when the optical element 100 is viewed from above) to a surface area of the low-refractive-index layer L of the topmost layer 10 is 5% or more and 70% or less. Since the pore density is 5% or more, the photocatalytic function of the optical element 100 can be maintained. In addition, since the pore density is 70% or less, a reflectance of the optical element 100 can be maintained Note that the pore density is more preferably 5% or more and 20% or less. Further, a cross section of the pore 30 has a circular shape, and a diameter thereof (corresponding to a shortest length w of the cross section of the pore 30 when the pore 30 is elliptical) is 10 nm or more and 5 µm or less. When the pore 30 has a circular shape, processing can be made relatively easy. In addition, since the shortest length w of the pore 30 is 10 nm or more, dirt that cannot be completely decomposed by the photocatalytic effect does not easily accumulate in the pores 30, and the photocatalytic function of the optical element 100 can be maintained. In addition, since the shortest length w of the pore 30 is 5 µm or less, it is difficult for a user to visually recognize, and stray light can be prevented. Note that, when the pore density is 5% or more and 20% or less, the shortest length w of the cross section of the pore 30 can be made 10 nm or more and 5 µm or less, preferably 500 nm or more and 5 µm or less. Further, when the pore density is more than 20% and 70% or less, the shortest length w of the cross section of the pore 30 is preferably 10 nm or more and less than 500 nm. Since the pore 30 having the length w of 500 nm or more and 5 µm or less affects a reflectance of visible light, the pore density is set to a range of 5% or more and 20% or less. Whereas, when the length w of the pore 30 is set to 10 nm or more and less than 500 nm, a size of the pore 30 has almost no effect on the reflectance. Therefore, the pore density can be further expanded to a range of more than 20% and 70% or less.

Further, the plurality of pores 30 are uniformly arranged in the low-refractive-index layer L of the topmost layer 10. This allows the photocatalytic function of the optical element 100 to be uniformly exhibited. Note that a space between the adjacent pores 30 may be several tens nm to several µm.

Further, the optical element 100 of the present embodiment desirably satisfies the following conditional expression.

$$60 \text{ nm} \leq TL \leq 350 \text{ nm} \tag{1}$$

$$50 \text{ nm} \leq T\text{cat} \leq 700 \text{ nm} \tag{2}$$

Here,
TL: a film thickness of the topmost layer 10
Tcat: a film thickness of the high-refractive-index layer H or the functional layer 20 adjacent to the topmost layer 10.

When a value of Conditional Expression (1) is equal to or less than an upper limit, the photocatalytic effect can be exhibited by exchanging active oxygen excited by UV light through the plurality of pores 30 provided in the topmost layer 10. Whereas, when the value of Conditional Expression (1) is equal to or greater than a lower limit, sufficient scratch resistance can be ensured since the superhydrophilic function of the topmost layer 10 can be easily maintained and a strong topmost film can be formed. Note that the optical element 100 preferably satisfies the following expression.

$$60 \text{ nm} \leq TL \leq 250 \text{ nm} \tag{1'}$$

When a value of Conditional Expression (2) is equal to or greater than the lower limit, a film thickness of the functional layer 20 can be secured, and a sufficient photocatalytic effect can be expected. Whereas, the photocatalytic effect can be expected as the thickness of the functional layer 20 increases. However, instead, it becomes difficult to obtain a desired spectral property required for the multi-layer coating. Therefore, the value of Conditional Expression (2) is desirably equal to or less than the upper limit. Note that the optical element 100 preferably satisfies the following expression.

$$50 \text{ nm} \leq T\text{cat} \leq 600 \text{ nm} \tag{2'}$$

The high-refractive-index layer H or the functional layer 20 adjacent to the topmost layer 10 is formed of an oxide containing Ti as a main component (for example, $TiO_2$). Ti oxides such as $TiO_2$ have a very high photocatalytic effect.

In particular, anatase-type $TiO_2$ is desirable as a material for the functional layer 20 because the photocatalytic effect is high.

The topmost layer 10 is mainly formed of, for example, $SiO_2$. The topmost layer 10 preferably contains 90% or more of $SiO_2$. UV light is less likely to be incident at night or outdoors, and oxides containing Ti as a main component reduce a hydrophilic effect. However, even in such a case, the superhydrophilic effect can be exhibited by forming the topmost layer 10 from $SiO_2$, and the scratch resistance can be further enhanced. Having the superhydrophilicity means that a contact angle of 10 μl of water droplets on the optical element 100 is 20° or less, preferably 10° or less. When $SiO_2$ is used for the topmost layer 10, the scratch resistance is improved by performing a heat treatment at 200° C. or higher for two hours after film formation.

Note that the topmost layer 10 may be formed of a mixture of $SiO_2$ and $Al_2O_3$ (provided that a composition ratio of $SiO_2$ is 90% by weight or more). This allows the hydrophilic effect to be exhibited even at night or outdoors, and the scratch resistance can be further enhanced by using the mixture of $SiO_2$ and $Al_2O_3$. When the mixture of $SiO_2$ and $Al_2O_3$ is used for the topmost layer 10, scratch resistance can be improved by performing a heat treatment at 200° C. or higher for two hours after film formation. Note that it is preferable to use the IAD method when forming a part or all of the topmost layer 10. This improves the scratch resistance.

It is preferable that each layer of the multi-layer coating MC is formed by a vapor deposition method, and any one of the individual layers is formed by the IAD method. The scratch resistance can be further improved by the film formation with the IAD method.

In particular, the topmost layer 10 is formed by the IAD method, the sputtering method, or the like. This can improve the film density and can improve the salt water resistance. Here, having salt water resistance means having a film thickness reduction value of 20 nm or less after a salt spray test described later.

The film density of the low-refractive-index layer L that is the topmost layer 10 is 98% or more. Here, the film density means a space-filling density. By setting the film density of the low-refractive-index layer L of the topmost layer 10 to 98% or more, the resistance to salt water can be further improved.

The optical element 100 preferably satisfies the following conditional expression.

$$1.35 \leq NL \leq 1.55 \quad (3)$$

Here,

NL: a refractive index of a material of the low-refractive-index layer L at a d-line By satisfying Conditional Expression (3), the optical element 100 having a desired optical property can be obtained. Here, the d-line refers to light having a wavelength of 587.56 nm. As the material of the low-refractive-index layer L, $SiO_2$ having a refractive index at the d-line of 1.48 or $MgF_2$ having a refractive index at the d-line of 1.385 can be used.

The optical element 100 preferably satisfies the following conditional expression.

$$1.6 \leq Ns \leq 2.2 \quad (4)$$

Here,

Ns: a refractive index of the glass substrate GL at the d-line

By satisfying Conditional Expression (4) as the refractive index of the glass substrate GL at the d-line in terms of optical design, the optical performance of the optical element 100 can be enhanced with a compact configuration. By forming the multi-layer coating MC of the present embodiment on the glass substrate GL satisfying Conditional Expression (4), it becomes possible to use for a lens or the like that is externally exposed, and to achieve both excellent environmental resistance performance and optical performance.

Hereinafter, a production method of the optical element 100 will be described with reference to FIG. 3 and the like. First, the low-refractive-index layer L and the high-refractive-index layer H as the multi-layer coating MC are alternately laminated on the glass substrate (glass base plate) GL (step S11). However, in step S11, layers except the topmost layer 10 and the functional layer 20 in the multi-layer coating MC are formed. That is, layers until the low-refractive-index layer L adjacent to the lower side of the functional layer 20 are formed. The multi-layer coating MC is formed by using various methods such as the vapor deposition method, the IAD method, and the sputtering method.

Next, the high-refractive-index layer H to be the functional layer 20 is formed on the multi-layer coating formed in step S11 (a functional layer forming step: step S12). The high-refractive-index layer H as the functional layer 20 is formed by using various methods such as the vapor deposition method, the IAD method, and the sputtering method. The high-refractive-index layer H as the functional layer 20 is formed of a material containing, as a main component, a metal oxide having a photocatalytic function (specifically, an oxide containing Ti as a main component, such as $TiO_2$). When obtaining anatase-type $TiO_2$ having a strong photocatalytic effect, it is desirable to form a film by using the IAD method or the sputtering method at a temperature of 200° C. or higher.

Next, the low-refractive-index layer L to be the topmost layer 10 is formed on the functional layer 20 (step S13). The low-refractive-index layer L as the topmost layer 10 is formed by using either the IAD method or the sputtering method. The low-refractive-index layer L as the topmost layer 10 is formed of $SiO_2$, a mixture of $SiO_2$ and $Al_2O_3$, or the like. In order to enhance the salt water resistance, the functional layer 20 is formed under a condition that a film density is 98% or more. Further, in order to obtain the topmost layer 10 having a film density of 98% or more, it is desirable to form the film by using the IAD method or the sputtering method at a temperature of 200° C. or more. In this way, an intermediate body 40 (in which the pores 30 are not formed in the topmost layer 10) in which the multi-layer coating MC is formed on the glass substrate GL is formed.

Next, a plurality of pores 30 are formed in the low-refractive-index layer L of the topmost layer 10 (step S14). The pores 30 are formed by electron beam (EB) drawing. Hereinafter, the forming step of the pores 30 will be described with reference to FIGS. 4A to 4G.

Figure 4A:
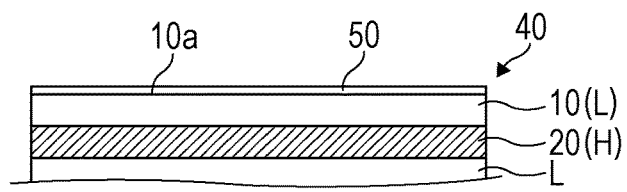
FIGS. 4A to 4G are conceptual views for explaining a pore forming step in the optical element production method.

First, as shown in FIG. 4A, a surface 10a of the topmost layer 10 is cleaned, and then a surfactant 50 (OAP (hexamethyldisilazane), manufactured by Tokyo Ohka Kogyo Co., Ltd.) is applied to the surface 10a of the topmost layer 10. Specifically, the intermediate body 40 is spin-coated with OAP at 3000 rpm for 30 seconds. Then, the intermediate body 40 is prebaked by heating at 110° C. for one minute with use of a hot plate (not shown).

Figure 4B:
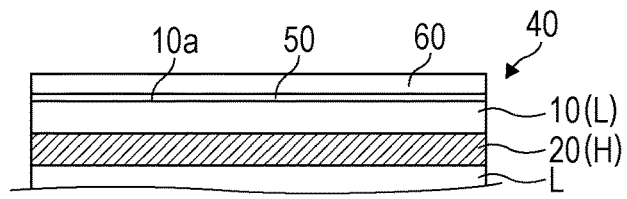

Next, as shown in FIG. 4B, an ultra high resolution electron beam (EB) resist 60 (ZEP520A, manufactured by Zeon Corporation) is applied to the intermediate body 40. Specifically, the intermediate body 40 is spin-coated with ZEP510A at 4000 rpm for 60 seconds. Thereafter, the intermediate body 40 is heated at 180° C. for five minutes with use of a hot plate (not shown).

Figure 4C:
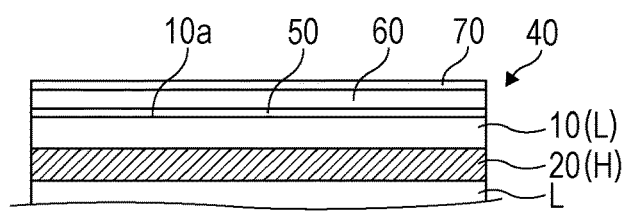

Next, as shown in FIG. 4C, an espacer 70 is applied on the EB resist 60 of the intermediate body 40. When a surface of the intermediate body 40, specifically, the surface 10a of the topmost layer 10 is insulating, it is necessary to apply the espacer 70 on the EB resist 60 to release electrons. The intermediate body 40 is spin-coated with the espacer 70 at 3000 rpm for 60 seconds. Then, the intermediate body 40 is heated at 110° C. for 10 minutes with use of a hot plate (not shown). Note that, instead of heating, the espacer 70 may be left at room temperature for 30 minutes to be dried.

Figure 4D:
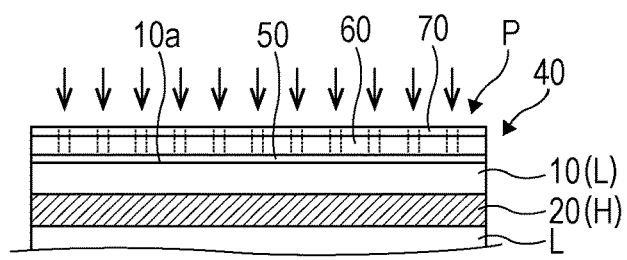

Next, as shown in FIG. 4D, EB drawing is performed with use of an EB device (not shown). Specifically, the EB resist 60 is exposed in accordance with a preset pattern P of the pores 30 (specifically, a pattern corresponding to a lattice-shape arrangement of the pores 30 illustrated in FIG. 2). Here, an exposure condition of the EB device is set to 110 μJ/cm$^2$. After the exposure, rinsing the intermediate body 40 with pure water for five seconds is repeated three times to remove the espacer 70. Thereafter, the intermediate body 40 is post-baked by heating at 110° C. for five minutes with use of a hot plate (not shown).

Figure 4E:
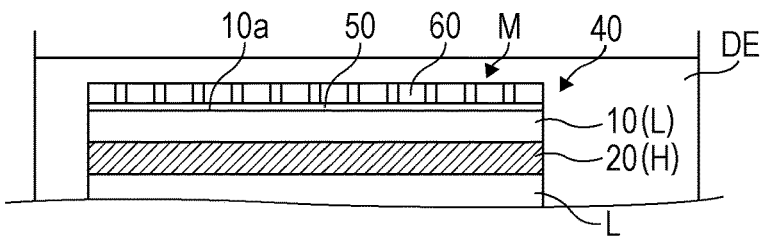

Next, as shown in FIG. 4E, the EB resist 60 is developed by immersing in a developer DE (ZED-N50, manufactured by Zeon Corporation) for 60 seconds. This causes formation of a mask M of the EB resist 60 having the pattern P of the pores 30.

Figure 4F:
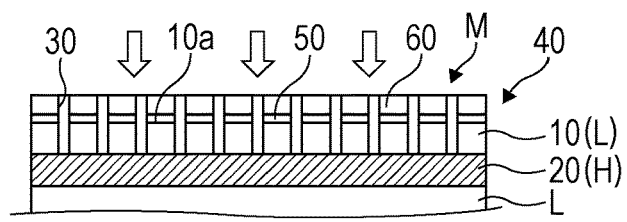

Next, as shown in FIG. 4F, dry etching is performed with use of an etching device (not shown). As a result, the topmost layer 10 of the exposed portion of the mask M is etched to form the pores 30, and a surface of the functional layer 20 is to be partially exposed. As etching gas, for example, $CHF_3$, $CF_4$, $SF_6$ or the like is used.

Figure 4G:
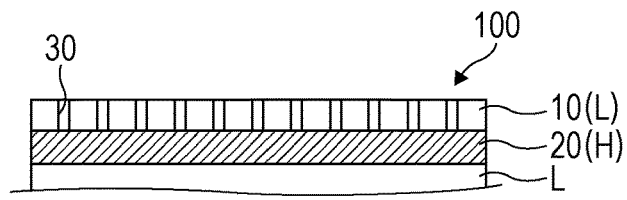

Finally, as shown in FIG. 4G, the EB resist 60 is peeled off from the optical element 100. Specifically, the EB resist 60 is removed by wet etching using acetone. Further, the EB resist 60 may be removed by dry etching using $O_2$ plasma, for example.

Through the above steps, the optical element 100 having the plurality of pores 30 in the topmost layer 10 can be obtained.

According to the optical element described above, since there is a photocatalyst on the surface 10a of the topmost layer 10, and the high-refractive-index layer H, which is the functional layer 20 adjacent to the low-refractive-index layer L of the topmost layer 10, has the plurality of pores 30 for exertion of the photocatalytic function, it is possible to sufficiently ensure the photocatalytic function of the optical element 100. The pores 30 have such a size that allows the functional layer 20 to exert the photocatalytic function, are not visible to the user, and have resistance to salt water. This allows the optical element 100 to achieve both the salt water resistance and the photocatalytic function.

In this way, the optical element 100 has a multi-layer coating having excellent salt water resistance and scratch resistance, can exhibit the photocatalytic effect, and is suitably used for in-vehicle lenses, communication lenses, and building materials.

EXAMPLES (1) Evaluation of Topmost Layer Film Structure and Optical Element

Hereinafter, specific examples of the optical element 100 according to the present embodiment will be described. In forming a multi-layer coating of the following examples and comparative examples, a film deposition device (BES-1300) (manufactured by Shincron Co., Ltd.) was used, and NIS-175 was used as an ion source for IAD.

A sample was prepared by forming a nine-layer multi-layer coating on a glass substrate by the vapor deposition method or the IAD method, while changing a pore density and a film density of a topmost layer. More specifically, as shown in Table 1, a film was formed by laminating a low-refractive-index layer using L5 (manufactured by Merck Ltd.), a high-refractive-index layer using OA600 (material manufactured by Canon Optron, Inc.), and a functional layer using $TiO_2$ on a glass substrate TAFD5G (manufactured by HOYA Corporation: refractive index 1.835), in the order shown in Table 1. $SiO_2$ was used as the topmost layer. Table 1 shows a film-formation formula and a film structure of each layer (a layer in contact with the glass substrate (glass base plate) is the first layer). Here, each film thickness (d (nm)) was fixed, and a film formation rate (Å/SEC) of each film was also fixed.

TABLE 1

Film structure d-line (587.56 nm)

| Layer number | Layer material | Film thickness (nm) | Reflectance |
|---|---|---|---|
| 9 | L5 | 87.20 | 1.429 |
| 8 | $TiO_2$ | 285.20 | 2.132 |
| 7 | $SiO_2$ | 7.13 | 1.429 |
| 6 | OA600 | 174.92 | 2.104 |
| 5 | $SiO_2$ | 32.24 | 1.429 |
| 4 | OA600 | 26.27 | 2.104 |
| 3 | $SiO_2$ | 67.17 | 1.429 |
| 2 | OA600 | 20.28 | 2.104 |
| 1 | $SiO_2$ | 31.69 | 1.429 |
| | TAFD5G | | 1.835 |

Film-formation formula

| Layer material | RATE (Å/SEC) | Gas introduction amount (Pa) APC | IAD |
|---|---|---|---|
| L5 (topmost layer) | 2.2 | 2.50E-02 | Yes |
| $TiO_2$ (functional layer) | 2.0 | 3.00E-02 | Yes |

IAD formula

| Layer material | Acceleration voltage (V) | Acceleration current (mA) | Oxygen introduction amount (SCCM) |
|---|---|---|---|
| L5 (topmost layer) | 500 | 500 | 50 |
| $TiO_2$ (functional layer) | 500 | 500 | 50 |

OA600 in Table 1 is a mixture of $Ta_2O_5$, TiO, and $Ti_2O_5$, and its specific composition is, as shown in Table 2, tantalum oxide as a main component.

TABLE 2

| Tantalum oxide (V) | Titanium oxide (II) | Titanium oxide (III) |
|---|---|---|
| $Ta_2O_5$ 90% or more | TiO Less than 10% | $Ti_2O_5$ Less than 10% |

L5 in Table 1 is a mixture of $SiO_2$ and $Al_2O_3$, and a specific composition is as shown in Table 3.

TABLE 3

| Silicon dioxide | Aluminum oxide |
|---|---|
| $SiO_2$ | $Al_2O_3$ |
| 95% to 99% | 1% to 5% |

While the film-formation formula is as shown in Table 1, regarding the film formation of the topmost layer, the film density and the pore density were changed, and samples of Examples 1 to 5 (Samples 1 to 5) and Comparative Example 1 (Sample 6) were prepared and subjected to the following tests. Note that, for Sample 8 of the comparative example described later, as explained in an antireflection property described later, one in which the entire functional layer was exposed without the topmost layer provided was produced. A heating temperature was 370° C. and a starting vacuum degree was 3.00E-03 Pa (3.00×10⁻³ Pa), individually.

Here, "APC" is an abbreviation for auto pressure control, which means that a partial pressure is adjusted. "SCCM" is an abbreviation for standard cc/min, which is a unit that indicates how many cc has flowed per minute at 1 atmospheric pressure (atmospheric pressure 1013 hPa) and 0° C.

Note that the film density was measured by the following method.

(i) Only a high-refractive-index layer is formed on a base plate made of white plate glass BK7 (manufactured by SCHOTT) (φ (diameter)=30 mm, t (thickness)=2 mm), and a spectral reflectance of the high-refractive-index layer is measured. Whereas, (ii) a thin film calculation software (Essential Macleod) (SIGMAKOKI CO., LTD.) is used to calculate a theoretical value of a spectral reflectance of a layer made of the same material as the high-refractive-index layer. Then, by comparing the theoretical value of the spectral reflectance calculated in (ii) with the spectral reflectance measured in (i), the film density of the high-refractive-index layer is specified.

Table 4 below shows evaluation results of Samples 1 to 6 having different topmost layer film structures.

change was minimum (or the color did not disappear), the evaluation was given with a symbol x that indicates no photocatalytic effect.

For "reflectance", a reflectance measuring machine (USPM-RUIII) (manufactured by Olympus Corporation) was used to evaluate a reflectance of the sample at a maximum reflectance in a wavelength range of 420 nm to 670 nm. Here, when the reflectance was 5% or less, the evaluation was given with the symbol ○, and when the reflectance was more than 5%, the evaluation was given with the symbol Δ.

"Salt water resistance" was evaluated by conducting a salt spray test using a salt wetting and drying combined cycle tester (CYP-90) (manufactured by Suga Test Instruments Co., Ltd.). The test was conducted for eight cycles with the following steps (a) to (c) as one cycle.

(a) At a spray layer temperature of 35° C.±2° C., a solvent with a salt water concentration of 5% at 25±2° C. (NaCl, $MgCl_2$, $CaCl_2$, concentration (weight ratio) 5%±1%) is sprayed on the sample for two hours.

(b) After the spraying, the sample is left for 22 hours in an environment of 40° C.±2° C. and 95% RH.

(c) After repeating steps (a) and (b) four times, the sample is left for 72 hours in an environment of normal temperature (20° C.±15° C.) and normal humidity (45% RH to 85% RH).

When there was no change (reflectance change was 0%) in the spectral property of the sample after the test described above, the evaluation was given with a symbol ○. When the reflectance change was less than 2%, the evaluation was given with a symbol Δ. When the reflectance change was 2% or more, the evaluation was given with a symbol x.

For "visibility", the evaluation was made by visual inspection. Specifically, in the topmost layer, when pores were not visually observed, the evaluation was given with a symbol ○, and when the pores were visually observed, the evaluation was given with A.

For "contact angle", a contact angle measuring instrument (G-1) (manufactured by Elma Co., Ltd.) was used to drop 10

TABLE 4

| | | Film structure of topmost layer (low-refractive-index layer) | | | | Evaluation result | | | |
|---|---|---|---|---|---|---|---|---|---|
| | | Film density (%) | Pore density (%) | Pore size (diameter: nm) | Photocatalytic effect | Reflectance | Salt water resistance | Visibility | Contact angle (°) |
| Example 1 | Sample 1 | 100 | 10 | 10 to 5000 | ○ | ○ | ○ | ○ | 10 |
| Example 2 | Sample 2 | 98 | 10 | 10 to 5000 | ○ | ○ | Δ | ○ | 10 |
| Example 3 | Sample 3 | 100 | 5 | 10 to 5000 | Δ | ○ | ○ | ○ | 10 |
| Example 4 | Sample 4 | 100 | 20 | 10 to 5000 | ○ | Δ | ○ | ○ | 10 |
| Example 5 | Sample 5 | 100 | 10 | 5000 | ○ | ○ | ○ | Δ | 10 |
| Comparative Example 1 | Sample 6 | 95 | — | — | ○ | ○ | X | ○ | 10 |

Regarding "photocatalytic effect", in an environment of 20° C. and 80%, a pen-colored sample was subjected to UV irradiation for 20J in total, and a color change of the pen was evaluated stepwise. Specifically, the visualiser (manufactured by inkintelligent) was used as the pen. Here, when a degree of color change was large (or the color disappears), the evaluation was given with a symbol ○ that indicates a sufficient photocatalytic effect. When the degree of color change was medium (or the color becomes lighter), the evaluation was given with a symbol Δ that indicates the photocatalytic effect remains. When the degree of color μl of water droplet on the sample, to measure a contact angle. When the contact angle is 20° or less, evaluation can be made as having superhydrophilicity.

As shown in Examples 1 to 5 in Table 4, when the film density of the topmost layer 10 is 98% or more, and the pore density of pores having a diameter of 10 nm to 5 μm is 5% to 20%, the optical element has the desired property. Whereas, as shown in Comparative Example 1, when the topmost layer 10 is not provided with pores, it can be seen that the salt water resistance is significantly reduced when the film density of the topmost layer is less than 98% in order to maintain the photocatalytic effect.

(2) Relationship Between Pore Density and Antireflection Property

FIG. 5 shows spectral reflectance of the multi-layer coatings of Samples 1, 3, and 4 shown in Table 4. That is, Samples 1, 3, and 4 in FIG. 5 correspond to Examples 1, 3, and 4 in Table 4. Further, in FIG. 5, Sample 7 is a comparative example in which pores are not formed in the topmost layer having a film density of 100%, and Sample 8 is a comparative example in which the topmost layer is not provided. In FIG. 5, a vertical axis represents a reflectance (unit: %), and a horizontal axis represents a wavelength (unit: nm). FIG. 5 shows that the optical element 100 having a reflectance equal to or less than a dotted line (reflectance 5%) representing a standard has the antireflection property. As shown in FIG. 5, it can be seen that the multi-layer coatings MC shown in Examples 1, 3, and 4 and the comparative example of Sample 7 have the antireflection property in a visible range of approximately 400 to 700 nm. Whereas, as shown in the comparative example of Sample 8, when the topmost layer is not provided, the optical element has no antireflection property. From the above, it can be seen that the antireflection property of the optical element is maintained as long as the pore density of the pores having a diameter of 10 nm to 5 µm is 5% to 20%, even if pores are formed in the topmost layer.

Although the optical element and the production method thereof as a specific embodiment have been described above, the optical element and the like according to the present invention are not limited to the above. For example, in the embodiment described above, the plurality of pores 30 are evenly arranged in the topmost layer 10, but the pores 30 need not be arranged evenly as long as the photocatalytic effect is maintained.

Further, in the embodiment described above, the cross section of the pore 30 is circular, but may have other shape such as elliptical or rectangular. When an aspect ratio of the shape of the pore 30 is different, a shortest length w of the cross section of the pores 30 is made 10 nm or more and 5 µm or less. Further, the pores 30 are not limited to being arranged in a lattice shape, and pores such as elongated grooves may be arranged in a stripe shape.

Further, in the embodiment described above, film thicknesses of the topmost layer 10 and the functional layer 20 are not limited to the ranges defined by Conditional Expressions (1) and (2), but can be appropriately changed in accordance with an optical design such as antireflection.

Further, in the embodiment described above, at least one layer of the high-refractive-index layers H may be formed of a specific material containing Ta, Hf, Zr, or Nb as a main component. As substances effective for improving acid resistance, there are oxides of Ti, Ta, Hf, Zr, and Nb. "Containing as a main component" means that a content of the element is 51% by weight or more, preferably 70% by weight or more, more preferably 90% by weight, and further preferably 100% by weight. The multi-layer coating is made of a material containing Ta, Hf, Zr, and Nb as a main component and provided with an appropriate film thickness to have sufficient acid resistance, and therefore can be provided on the glass substrate GL that is weak against acid.

The invention claimed is:

1. An optical element obtained by forming a multi-layer coating having two or more layers on a base plate that is optically transparent, wherein
the base plate is an imaging lens of a camera,
the multi-layer coating has at least one low-refractive-index layer and at least one high-refractive-index layer,
a topmost layer farthest from the base plate is the low-refractive-index layer,
the high-refractive-index layer adjacent to the topmost layer is a functional layer containing, as a main component, a metal oxide having a photocatalytic function, and
the topmost layer has a plurality of pores that partially expose a surface of the functional layer, and the plurality of pores is uniformly distributed in the topmost layer.

2. The optical element according to claim 1, wherein a film density of the topmost layer is 98% or more.

3. The optical element according to claim 1, wherein a ratio of a total area of cross sections of the plurality of pores to a surface area of the topmost layer is 5% or more and 70% or less.

4. The optical element according to claim 3, wherein a ratio of a total area of cross sections of the plurality of pores to a surface area of the topmost layer is 5% or more and 20% or less, and a shortest length of a cross section of each of the plurality of pores is 10 nm or more and 5 µm or less.

5. The optical element according to claim 4, wherein a cross section of each of the plurality of pores has a circular shape, and a diameter is 10 nm or more and 5 µm or less.

6. The optical element according to claim 1, wherein the functional layer is made of an oxide containing Ti as a main component.

7. A production method of an optical element obtained by forming a multi-layer coating having two or more layers on a base plate that is optically transparent, wherein
the base plate is an imaging lens of a camera,
the multi-layer coating has at least one low-refractive-index layer and at least one high-refractive-index layer,
the production method comprising:
forming the low-refractive-index layer as a topmost layer farthest from the base plate;
forming a functional layer containing, as a main component, a metal oxide having a photocatalytic function as the high-refractive-index layer adjacent to the topmost layer; and
forming, in the topmost layer, a plurality of pores that partially expose a surface of the functional layer, wherein the plurality of pores is uniformly distributed in the topmost layer.

8. The production method of an optical element according to claim 7, wherein the topmost layer is formed by either an ion assisted deposition method or a sputtering method.

9. The production method of an optical element according to claim 7, wherein the plurality of pores are formed by electron beam drawing.

10. The optical element according to claim 2, wherein a ratio of a total area of cross sections of the plurality of pores to a surface area of the topmost layer is 5% or more and 70% or less.

11. The optical element according to claim 2, wherein the functional layer is made of an oxide containing Ti as a main component.

12. The optical element according to claim 3, wherein the functional layer is made of an oxide containing Ti as a main component.

13. The optical element according to claim 4, wherein the functional layer is made of an oxide containing Ti as a main component.

14. The optical element according to claim 5, wherein the functional layer is made of an oxide containing Ti as a main component.

15. The production method of an optical element according to claim 8, wherein the plurality of pores are formed by electron beam drawing.

16. The optical element according to claim 1, wherein the plurality of pores is equally spaced.

\* \* \* \* \*